Aug. 30, 1949.  D. E. STRAIN ET AL  2,480,615
WORKING OF POLYETHYLENE
Filed Aug. 28, 1946
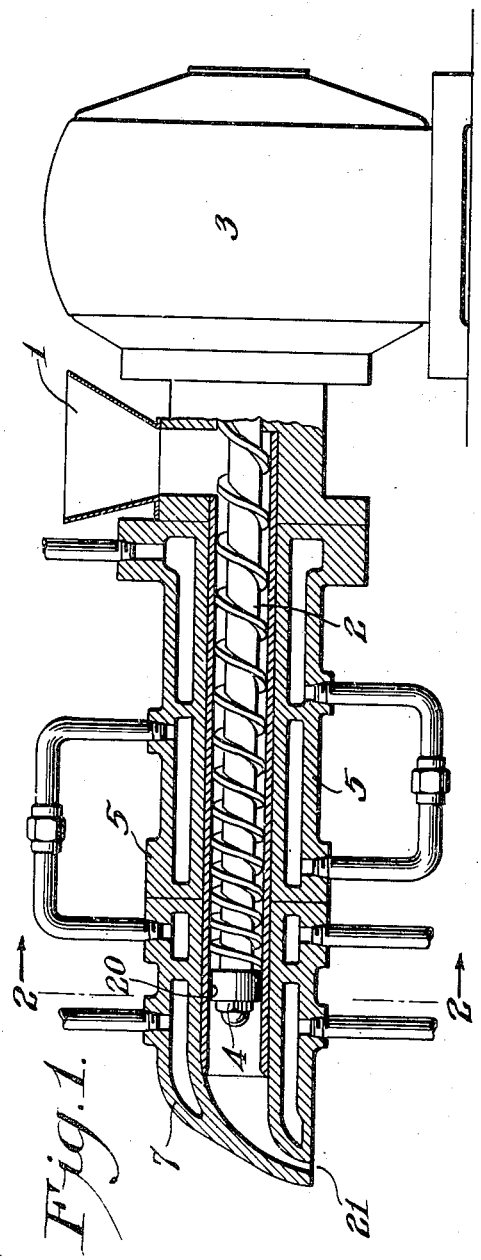
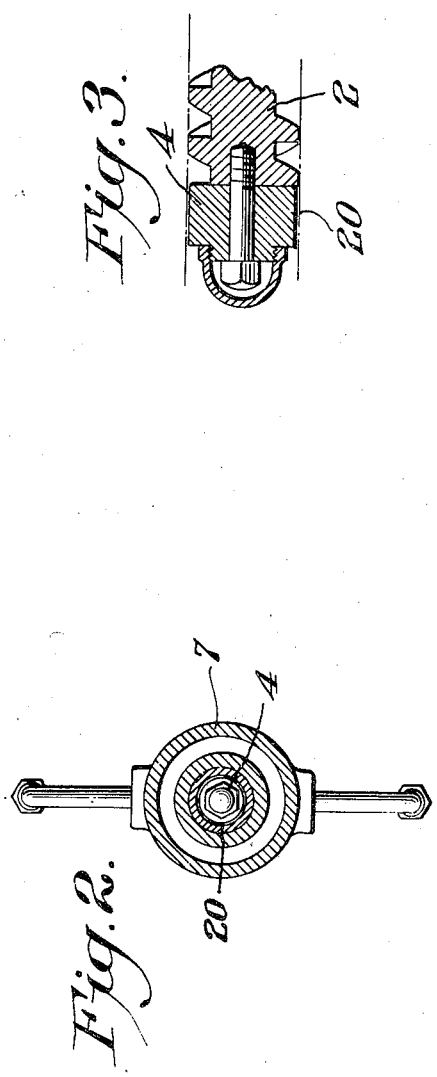
INVENTORS
Daniel E. Strain and
Walter V. Osgood
BY
ATTORNEY Patented Aug. 30, 1949

2,480,615

UNITED STATES PATENT OFFICE 2,480,615

WORKING OF POLYETHYLENE

Daniel E. Strain, Wilmington, Del., and Walter V. Osgood, Southeast Charleston, W. Va., assignors to E. I. du Pont de Nemours & Company, Wilmington, Del., a corporation of Delaware Application August 28, 1946, Serial No. 693,538

6 Claims. (Cl. 18—48)

This invention relates to the treatment of polymers of ethylene and more particularly to mechanical working of the high molecular weight polymers of ethylene.

The polymers of ethylene having a wide range of molecular weights are prepared by processes wherein the ethylene is subjected to pressures ranging up to about 3,000 atmospheres or higher and at temperatures up to about 400° C. The solid polymers which have an intrinsic viscosity above about 0.75 [1] may be prepared by selecting proper temperature and pressure conditions coming under the above broad ranges and are preferably prepared in accord with the process described in the Fawcett et al. U. S. Patent 2,153,553 of April 11, 1939, or by any other process that will produce products of a similar grade.

The solid polymers of ethylene are suitable for many purposes as produced but there are some uses which require a polymer having special properties. For example, in the coating of wire cables which is accomplished by simultaneously passing a wire through an orifice while extruding the thermoplastic around the wire, it is essential, for successful efficient operation, to apply a contiguous, smooth coating at as high a rate of speed as possible. Wire coating with thermoplastics is at the present time conducted at high speeds, and it is a requirement of the wire coating industry that the thermoplastic be of such a nature that it can be applied to the wire at high rates and at the same time give a contiguous smooth covering with no voids in proximity of the wire. Moreover, in the preparation of sheets for wrapping, as fabric substitutes and other purposes, it is essential that the thermoplastic can be cast, extruded or otherwise formed into a sheet that is substantially transparent, free from graininess and otherwise pleasing to the eye.

The solid polymers of ethylene and especially those having an intrinsic viscosity of at least 0.75, while they are, as prepared from the high pressure synthesis, capable of being used directly in the coating of wire, in the preparation of sheet materials, and in the formation of other products, have certain inherent properties which detract from otherwise unexcelled properties. Optimum coating speeds on wire with satisfactory quality of product cannot be prepared from such polymers, and while sheets can be formed by casting or by extrusion, the finished sheet has a more or less undesirable grain. It goes without saying that polymers of ethylene having these disadvantageous properties for the above and other uses would be rendered more valuable if they could be converted into a thermoplastic free from them.

An object of the present invention is to provide a solid polymer of ethylene from which the above and other disadvantageous properties have been substantially completely eliminated. Another object of the invention is to provide a process whereby solid polymers of ethylene as produced by the superatmospheric pressure and elevated temperature polymerization of ethylene are subjected to such treatment that they can be extruded rapidly about a wire giving a smooth contiguous superior coating and can be formed into sheets which are substantially transparent and free from grain. Yet another object of the invention is to provide a mechanical treatment to improve the microstructure of the solid polymers of ethylene. Other objects and advantages of the invention will hereinafter appear.

The process of the invention may be broadly described as involving the passing of a solid polymer of ethylene at a temperature above its softening point and preferably above about 100° C. through a constricted area in which the polymer is subjected to very high shearing stresses. The high shearing stress may be applied in various ways. For example, the molten polymer may be forced through any suitable opening such as a circular orifice, rectangular aperture, or other constricted area wherein the molten polymer is subjected, for an appreciable period of time, to high, frictional heat-developing forces. There are inter alia at least three requirements for such an aperture. The first is that it be sufficiently narrow (i. e. small at least in one dimension) when viewed in a plane at right angles to the general direction of flow of the polymer, in other words in one direction, at a right angle to the path of flow of the polymer. The width of this cross section, however, is not sufficient of itself to effect the advantageous conversion of the polymer to the desired product and consequently a spinneret orifice or a simple extruding orifice of relatively little depth is not suitable. The sec-

---

[1] The intrinsic viscosity is obtained by calculations from the following equations:

$$|\bar{n}| = \frac{\ln n\ \text{rel.}}{C}$$

where $|\bar{n}|$ = intrinsic viscosity $$n\ \text{rel.} = \frac{n\ \text{solution}}{n\ \text{solvent}}$$

C = concentration in grams per 100 cc.; and $\ln$ is the natural for Naperian logarithm (Staudinger, Zeitsch. Phys. Chem. 171, 29 (1934)).

ond requirement is that the aperture be so constructed and arranged that the forces are also applied to the polymer longitudinally and parallel to the direction of polymer flow. A third requirement involves a rotational force applied to the polymer while being subjected to the opposed forces above described.

The above requirements obviously exclude the use of spinnerets which have essentially only constricted cross sectional areas of opening, of little depth, neither exerting a rotational force nor having length and hence do not supply these necessary forces. As a consequence the polymer when passed through a spinneret or similarly constricted orifice would not be under the required forces to provide the necessary mastication to give the proper working of the polymer.

An example of an embodiment of the invention is a small cylindrical opening or annulus of considerable depth through which the polymer is forced from one end of the cylinder to the other while being subjected to a rotational force. Such an annulus may gradually diminish in its cross-sectional area, taken substantially perpendicular to the direction of the flow of polymer, or the smallest diameter may be intermediate the inlet and outlet or the variation in this area of the annulus may be similar to the variation in the area of the more or less theoretical orifice already described.

Inasmuch as the polymers softened at temperatures of 100° C., or above, are very viscous, the process can be effected only by the application of considerable pressure and this is preferably provided by feeding the solid polymer into an Archimedes' screw which forces the polymer into and through the orifice. The process is not to be confused with ordinary extrusion of a thermoplastic material whereby that material is formed into various shapes or extruded about a core but on the contrary is a preliminary treatment of the solid polymers prior to their possible extrusion to give formed parts or prior to their extrusion about an electric cable, or for other use. It, of course, is possible to pass the polymer properly worked in accord with the process of this invention directly through a die to shape it into the finished shape or form.

A preferred embodiment of the invention is illustrated by the accompanying drawing which is a diagrammatical cross-sectional elevation of a masticating machine wherein the solid polymers can be treated to give a product having the above designated desirable properties.

In the operation of the masticator illustrated by Fig. 1, the solid polymers of ethylene having the designated intrinsic viscosity are introduced into hopper 1 and are forced by the Archimedes' screw 2, rotated by means of a power source 3, toward the smearhead 4, which is fixed to the screw and rotates with it to give a peripherical speed of 60 to 700 feet per minute. As the polymer, which is preferably introduced in powdered or granulated form, advances along the Archimedes' screw 2, it is heated or cooled by jacket 5. Heat is also provided by the forces exerted on the polymer. The finished polymer is discharged from the machine through any suitable opening 21, which may, for example, be of a rectangular cross-section. The Archimedes' screw 2, may be designated to have a diminishing pitch as the screw advances and where the polymer enters the annulus about the base of the smearhead 4, although this is not an essential detail of construction, the outer face 20 of the smearhead 4 is separated from the inner wall of the extruder casing by a suitable clearance (these dimensions are more fully particularized hereinafter) which is the difference between the radii of the smearhead 4 and the casing about it. An alternate form of apparatus may be used in which the smearhead 4 and screw 2 are separately powered and operated. Such a structure permits flexibility in operation, the smearhead 4 being operable at one speed and direction, the screw 2, at another speed and direction.

Fig. 2 is a cross-section taken through the masticator at 2—2 and in the direction of the arrows shown in Fig. 1, which Fig. 3 shows in greater detail and is a cross-section of the smearhead 4.

The length 20 of the effective working portion of the smearhead may vary in accord with the clearance, the greater the clearance the greater the length and vice versa. The clearance, length of smearhead 4 and the rotation of the smearhead are co-related and when this is done in accord with the invention, a product is formed having the sought-for freedom from grain and ability to extrude about a wire at high speed giving a contiguous substantially bubble-free smooth coating. The three requirements, accordingly, of clearance, length and rotation should conform to these limitations. The clearance and length are so co-related that they are combined in what is called a "clearance factor" which is measured by the length of the smearhead 20, multiplied by the reciprocal of the clearance. This factor, it has been found, should be not less than 40. For example, with a smearhead 20, having a length of 2.5 inches, the clearance should be $\frac{1}{16}$ of an inch or less, giving a "clearance factor" of $$2.5 \times \frac{16}{1} = 40$$

While this is the minimum and will give products having a remarkable improvement, the preferred factor is greater than about 60 and for superior results to give polymer having no visual graininess, which can be extruded about wire at a high rate of speed, a factor of greater than 200 should be employed.

The above "clearance factor" is not independent of the rotational speed of the smearhead 4, for the greater the speed of rotation the greater the working and the more improved are the properties of the polymer. It has been found that with the aforesaid minimum "clearance factor" a peripheral speed of at least 90 feet per minute should be provided and preferably a speed of greater than 120 feet per minute. With this speed of rotation and the aforesaid clearance and length to give the designated "clearance factor" a combination of forces is specified which will give a product having most unexpected and heretofore unobtainable properties.

The temperature of the polymeric ethylene during the working operation is also a determining factor, for, the cooler it is the greater the amount of working and the better the product. It is of advantage to operate at the lowest permissible temperature commensurate with the strength of the apparatus and power available.

Considerable force is consequently required to rotate the screw 2, and the smearhead 4, with a smearhead having a diameter of about six inches and with the jacket 5, heated to a temperature of approximately 250° F. a 60 horsepower motor is required to force the polymer from the extruder at a rate of 200 lbs. per hour when an extruder jacket about the smearhead 4, is cooled to about 150° F. This large force results in the development of considerable heat which reaches its maximum within the annulus 6 of the smearhead 4. A cooling chamber 7 is provided about the smearhead for removing as much heat as possible at this position and may also be provided inside the smearhead 4 and screw 2. It has been found advisable to remove only a portion of the heat. For example, with a temperature of 250° F. in jacket 5, using a 1/32 inch clearance and 2 inches long annulus, a smearhead of 6 inches in diameter and a cast steel smearhead, the temperature in jacket 7 may be about 150° F.

The polymers of ethylene as synthesized under elevated temperatures and pressures are as produced not usually capable of being coated on wire at a satisfactory rate. The process as hereinbefore described converts the unsatisfactory polymer to a product which can be coated at a satisfactory rate, which on a standard machine hereinafter described is considered to be 100 ft. per minute and preferably better than 125 ft. per minute. Polymers untreated are usually coatable at speeds of 80 ft. per minute or less.

A standard extruder by which the above limiting speeds are determined may be of any suitable type such, for example, as the No. 1 Royle extruder which is provided with the usual type of a hinged, side-delivery, wire covering crosshead; an oil heater and oil circulating unit for heat transfer control in the extruder; a cooling trough; cable capstan; cable wind-up drum; holder for the uncovered wire; and a wire straightening device. The die and core tip design used in this test equipment is a section of "A–A" of Y–1235, provided by the Okonite Company and having an interior diameter of the cylindrical section of the die of 0.120 inch with a land length of 1/16 of an inch. On the inner side of the land the opening through which the resin flows flares out to a cone with an apex angle of 65° C. The die is so constructed with respect to the core tip that the adjustment between tip and core can be regulated at will.

Preparatory to a test, oil is circulated through the oil heating surfaces until a uniform temperature is attained, the screws adjusted to 38 R. P. M. and the distance between core tip and die adjusted to 150 mils. Wire is then threaded in the usual manner through the machine and the following conditions established.

Oil temperature

| | |
|---|---|
| Cross-head inlet, °C | 185 |
| Screw speed, R. P. M | 38 |
| Screw water: | |
|    Rate, pounds per hour | 0 |
| Die-core position, mils | 150 |
| Copper wire size, gauge | 20 |
| Cable size, inches | 0.116 |
| Cooling water trough temperature, °C | 60–70 |

The wire is drawn through the extruder at increasing rates. At a rate below about 50 feet per minute, solid polymers of ethylene as synthesized will give a smooth, contiguous coating. As the speed of the wire is increased the surface of such polythene becomes wavy and eventually roughens to such an extent that a wholly unsatisfactory wire coating is produced. The point at which the unsatisfactory waviness occurs is the measure of the suitability of the particular polymer under test.

A coated wire is considered satisfactory when it conforms with these conditions; viz., that it has a roughness of less than 150 micro inches (i. e., the root means squared of the elevation of the ridges in micro inches is less than this amount) and has no appreciable waviness or undulations when stroked with the fingers.

Sheets may be made from the treated polymer by casting from solution by any of the well-known solvent-casting techniques or extruding the solid polymer through a slit of proper dimensions.

The process as disclosed and claimed may be used in the treatment in addition to the aforementioned polymers of ethylene, of interpolymers, copolymers and mixtures of such polymers from ethylene.

We claim:

1. A process for the pretreatment of normally solid polymers of ethylene having an intrinsic viscosity greater than 0.75, giving a substantially grainless, freely extrudable polymer which comprises forcing the normally solid polymer of ethylene heated to a temperature above 100° C. and below 250° C. through a restricted space bounded by two concentrically mounted cylindrical surfaces, one of which rotates, the confined space having a "clearance factor" of at least 40 and the rotating surface a peripherial speed of at least 90 feet per minute, the polymer of ethylene being converted by the resulting forces to a product that can be extruded about a 20 gauge wire core in a standard extruder at a rate of at least 100 feet per minute to give a cable with a surface having a roughness of less than 150 micro inches and no appreciable waviness when stroked with a finger.

2. A process for the pretreatment of normally solid polymers of ethylene having an intrinsic viscosity greater than 0.75, giving a substantially grainless, freely extrudable polymer which comprises forcing the normally solid polymer of ethylene heated to a temperature above 100° C. and below 250° C. through a restricted space bounded by two concentrically mounted cylindrical surfaces, one of which rotates, the confined space having a "clearance factor" of at least 60 and the rotating surface a peripherial speed of at least 120 feet per minute, the polymer of ethylene being converted by the resulting forces to a product that can be extruded about a 20 gauge wire core in a standard extruder at a rate of at least 100 feet per minute to give a cable with a surface having a roughness of less than 150 micro inches and no appreciable waviness when stroked with a finger.

3. A process for the pretreatment of normally solid polymers of ethylene having an intrinsic viscosity of at least 0.75, giving a substantially grainless, freely extrudable polymer which comprises forcing the normally solid polymer of ethylene heated to a temperature above its melting point and below 250° C. through an annular space formed between a moving and a stationary cylindrical surface, the moving cylindrical surface having a peripherial speed of at least 90 feet per minute, the inner surface having a diameter of about 6 inches, a length of from 2.5 to 6 inches inclusive and a difference between the internal and external radii of the surfaces of not greater than 1/16 of an inch, the polymer of ethylene being converted by the resulting forces to a product that can be extruded about a 20 gauge wire core in a standard extruder at a rate of at least 100 feet per minute to give a cable with a surface having a roughness of less than 150 micro inches and no appreciable waviness when stroked with a finger.

4. A process for the pretreatment of a normally solid polymer of ethylene which comprises passing, a normally solid polymer of ethylene having an intrinsic viscosity of at least 0.75, through an annular space having a thickness defined by internal rotating and external stationary cylindrical surfaces having a difference between the radii of the cylindrical surfaces of not greater than $\frac{1}{16}$ of an inch, and a length between the surfaces and parallel to the axis of the cylinders between 2.5 to 6 inches inclusive, the internal rotating surface having a peripherial speed of at least 90 feet per minute.

5. The process in accord with claim 4 in which the combined length of the annular space parallel to the axis of the cylinders and the difference between the radii of the cylindrical surfaces give a "clearance factor" of greater than 40.

6. A process of claim 4 in which the combined length of the annular space parallel to the axis of the cylinders and difference between the radii of the surfaces give a "clearance factor" of at least 200 and in which the inner surface has a peripherial speed of at least 120 feet per minute.

DANIEL E. STRAIN.
WALTER V. OSGOOD.

REFERENCES CITED

The following references are of record in the file of this patent:

UNITED STATES PATENTS

| Number | Name | Date |
|---|---|---|
| 2,188,465 | Perrin et al. | Jan. 30, 1940 |
| 2,295,942 | Fields | Sept. 15, 1942 |
| 2,333,786 | Hessen | Nov. 9, 1943 |
| 2,340,834 | Hanson | Feb. 1, 1944 |